Feb. 1, 1966  E. S. McKEE ETAL  3,232,690
SHUTTER MECHANISM

Filed Sept. 6, 1963  2 Sheets-Sheet 1

EDWARD S. McKEE
GERALD L. JENKINS
DAVID L. BABCOCK
INVENTORS

BY R. Frank Smith

ATTORNEYS

EDWARD S. McKEE
GERALD L. JENKINS
DAVID L. BABCOCK
INVENTORS

BY R. Frank Smith

ATTORNEYS

United States Patent Office 3,232,690
Patented Feb. 1, 1966

3,232,690
SHUTTER MECHANISM
Edward S. McKee, Gerald L. Jenkins, and David L. Babcock, Rochester, N.Y., assignors to Eastman Kodak Company, Rochester, N.Y., a corporation of New Jersey
Filed Sept. 6, 1963, Ser. No. 307,143
12 Claims. (Cl. 352—209)

The present invention relates to a shutter mechanism for a motion picture projector and more particularly to a shutter mechanism for increasing the number of shutter blades for flickerless slow speed projection.

Motion picture projectors are normally provided with a multi-bladed shutter for interrupting the light beam projecting an individual frame of the filmstrip onto a screen. At normal projection speeds, a multi-bladed shutter is desirable so as to obtain maximum uniform brightness of the projected picture on the observing screen and to eliminate light flicker. However, because the film advancing mechanism is generally driven by the shutter shaft, when the speed of the projector is reduced for slow motion effects, there is a corresponding reduction in the rotational speed of the shutter resulting in light flicker. Light flicker is directly related to the number of light interruptions by the shutter blades in a given period of time and generally occurs when the number of interruptions is less than fifty interruptions per second. Thus, if a motion picture projector is operated for slow motion effects with an accompanying reduction in shutter interruptions, light flicker can be eliminated by increasing the number of shutter blades to obtain fifty interruptions per second.

An object of this invention is to provide a shutter mechanism which will automatically increase the number of light interruptions when the speed of the projector is reduced for slow motion; and, conversely, to reduce the number of shutter blades when the speed of the projector is changed from slow motion to normal speed.

A further object of this invention is to provide a shutter mechanism which is coupled with the film advance mechanism, such that when it is desired to reduce the projector speed, the number of blades of the shutter mechanism automatically increase.

Another object of this invention is to provide a shutter mechanism which is coupled to a selective shifting device which automatically changes the number of shutter blades when the shifting device is moved from normal to slow motion operation and vice-versa.

Other objects and a fuller understanding of the invention can be had by referring to the following description and claims taken in conjunction with the drawings in which:

To better understand the novel shutter mechanism described hereinbelow, a brief summary will be helpful. A first shutter disk having a pin projecting from one of its faces is fixed to the rotating shutter shaft of the motion picture projector. The shutter disk has one or more shutter blades projecting radially therefrom wihch sweep through a circular path such that the individual blades of the shutter interrupt the projection light beam emanating from a light source. A second shutter disk which is mounted for rotation on the shutter shaft is coupled to the first shutter disk by means of a pin-in-slot connection. The second shutter disk has substantially the same number of blades as the first shutter disk so that when the blades of the two disks are aligned with each other they interrupt the light beam at the same moment. A first driven pulley mounted for rotation on the shutter shaft is connected to a drive shaft by a drive belt. The pulley is axially movable along the shutter shaft, and is normally coupled to drive the first shutter disk at a given speed. A second driven pulley which is mounted on the shutter shaft for rotation and axial movement therealong is also coupled to the drive shaft to be driven therefrom.

The first and second driven pulleys are rotatable independently of each other, but are coupled so that they can be moved together between two positions along the shaft. When the pulleys are in the first of said two positions, the first driven pulley transmits power from the drive shaft to the shutter shaft and thence to the first disk which shutter disk in turn carries the second shutter disk with it. When the pulleys are shifted to the second of said two positions, the first driven pulley is uncoupled from the first shutter disk and the second driven pulley is coupled to the second shutter disk to drive the same. Because the driving force for the shutter shaft is now exerted through the second shutter disk, the second shutter disk will rotate relative to the first shutter disk until the opposite end of the arcuate slot in said second disk picks up the pin on the first shutter disk to drive said first shutter disk and the shutter shaft to which it is fixed. The relative movement between the two shutter disks, resulting from the pin-in-slot connection between the two, arcuately displaces the blades of the first shutter disk relative to the blades of the second shutter disk, thereby increasing the number of blades for interrupting the light beam. Thus, if the second driven pulley has a diameter which is greater than the diameter of the first driven pulley, the speed of the pulldown mechanism will be reduced for slow motion effects and the number of blades comprising the shutter can be increased sufficiently to interrupt the light beam approximately fifty times per second to eliminate light flicker.

Figure 1:
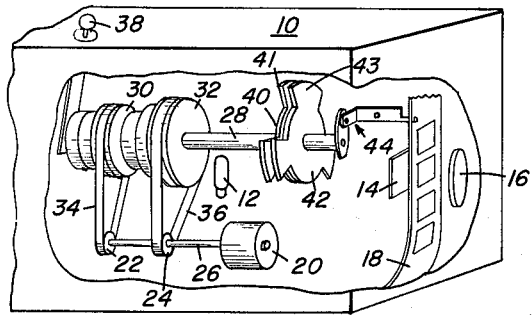
FIG. 1 is a fragmentary perspective view of a motion picture projector incorporating my invention.

Referring more particularly to FIG. 1 of the drawings, our improved shutter mechanism is disclosed in association with a motion picture projector. The projector housing 10 encloses an optical system comprising a reflector type lamp 12, gate 14 and projecting lens 16 for projecting individual frames of a motion picture filmstrip 18 onto a screen (not shown). A reversible drive motor 20, having a pair of drive pulleys 22 and 24, respectively, spaced on its drive shaft 26, is mounted on the base of housing 10. A shutter shaft 28, journaled within housing 10, and above drive shaft 26, has a pair of spaced driven pulleys 30 and 32, rotatably mounted thereon and substantially in alignment with the respective drive pulleys 22 and 24. Pulley belts 34 and 36, respectively, couple driven pulleys 30 and 32 to their respective drive pulleys 22 and 24 on drive shaft 26. Projector speed control lever 38, pivotally mounted on housing 10, selectively determines which of the driven pulleys will be coupled in driving relationship with drive shaft 26. A pair of three bladed shutter disks 40 and 42, having aligned shutter blades 41 and 43, respectively, are mounted on shutter shaft 28 to interrupt the light passing through the optical system. Pulldown mechanism 44 is also operatively coupled to shutter shaft 28 for intermittently moving filmstrip 18 through gate 14 past the optical system. By the mechanism more particularly described hereinbelow, the pair of shutter disks 40 and 42 can be displaced an arcuate distance relative to each other when the control lever 38 is moved from a normal forward position to a slow speed position.

Figure 4A:
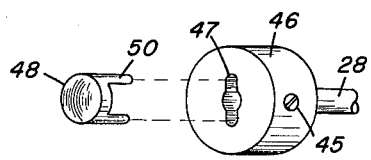
FIG. 4a is an exploded perspective view of the actuator for the shutter mechanism shown in FIGS. 2 and 4.
Figure 4:
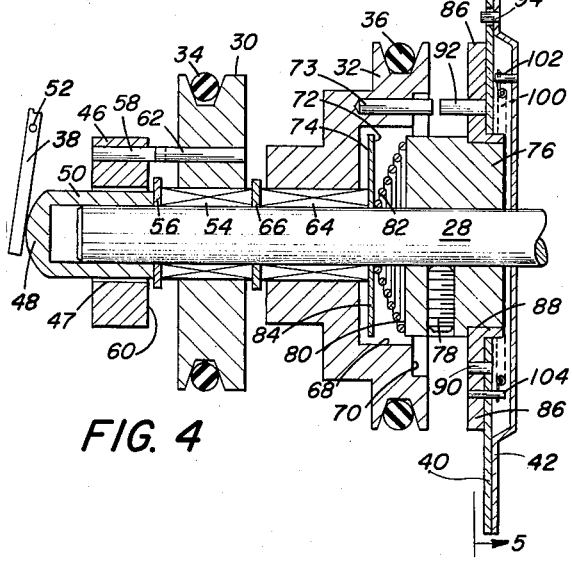
FIG. 4 is a side view, in cross-section, showing the shutter mechanism in the normal speed position.

As best shown in FIGS. 4 and 4a, a circular collar 46 is fastened by screw 45 to shutter shaft 28 adjacent one end thereof. Two or more longitudinal grooves 47 are formed in the marginal portion adjacent the inner periphery of collar 46. A pulley actuator member 48, of the form best shown in FIG. 4, having the same number of legs 50 as the collar 46 has grooves 47, fits over the end of shutter shaft 28 with its legs 50 slidably engaging grooves 47 and extending completely through collar 46. Lever 38 engages actuator member 48 and is adapted to be rotated about its pivot point 52 to move actuator member 48 lengthwise of shaft 28.

Driven pulley 30, carried on circular slide bearing 54, is revolvably mounted for rotation relative to shaft 28. A ring-shaped washer 56 separates the ends of legs 50 from the end face of bearing 54. Pins 58 projecting from the inner face 60 of collar 46 towards pulley 30 and at a given distance from the axis of shutter shaft 28, moves in a given circle of rotation. A similar pin 62 on the face of driven pulley 30 projects towards collar 46 and moves in the same given circle of rotation as does pin 58.

Similarly, driven pulley 32, carried on circular slide bearing 64, is revolvably mounted for rotation relative to shaft 28. Driven pulley 32 has a diameter which is greater than the diameter of pulley 30 so that if both pulleys 30 and 32 are driven by equal diameter drive pulleys 22 and 24, respectively, the peripheral speed of pulley 32 will be less than the peripheral speed of pulley 30. Ring-shaped washer 66 separates pulleys 30 and 32 so that they can rotate independently of each other. A centrally disposed circular cavity 68 is formed in face 70 of pulley 32. A ring-shaped washer 72 which can slide along shaft 28 is located within cavity 68, with face 74 thereof slidably engaging the end face of bearing 64. A pin 73 projects from face 70 of pulley 32 and is located at a radius from the center axis of shaft 28 which is greater than the radius of cavity 68.

A circular hub member 76, partially extending into cavity 68, is fastened to shaft 28 by set screw 78. A coiled conical compression spring 82, whose base is positioned on the face 80 of hub member 76, slidably engages face 84 of washer 72 and urges pulleys 30 and 32 towards collar 46. A circular ring member 86 is revolvably carried on recessed shoulder 88 formed in hub member 76. Shutter disk 40 is fastened to ring member 86 by pins 90. A pin 92 projects from ring member 86 towards pin 73 and is positioned on member 86 at a radius from the center axis of shaft 28 which is the same as pin 73.

Figure 5:
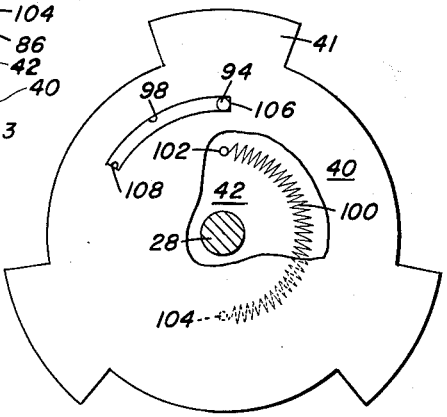
FIG. 5 is a view, partially in section, of the shutter mechanism taken along the line 5—5 of FIG. 4.

Shutter disk 42 is fastened to shaft 28 for rotation therewith, and moves in a plane of rotation which is parallel to the plane of rotation of disk 40. A pin 94 fastened to disk 42 projects away from face 96 thereof and is slidably accepted in arcuate slot 98 of disk 40. Coiled tension spring 100 extending between pin 102 on disk 42 and pin 104 on disk 40 biases pin 94 towards end 106 of slot 98. Thus, when shaft 28 is rotated in the forward (F) direction, as shown in FIG. 5, pin 94 on disk 42 carries disk 40 therewith. But when shaft 28 drives disk 42 in the reverse (R) direction, the tension force exerted by spring 100 is sufficient to retain disks 40 and 42 in the same position as they were when driven in the forward (F) direction.

In operation, control member 38 is preferably first positioned in the normal speed position, as best shown in FIG. 4, wherein member 38 exerts little or no force on actuator member 48. Compression spring 82 seated on hub 76 exerts a biasing force on washer 72 to displace slide bearings 54 and 64, washers 56, 66, and 72, and actuator member 48 longitudinally on shutter shaft 28 until washer 56 engages face 60 of collar 46. Driven pulleys 30 and 32 carried by bearings 54 and 64, are also displaced such that the path of rotation of pin 62 of pulley 30 intercepts the path of rotation of pin 58 of collar 46, whereas, pin 73 of pulley 32 is displaced from the path of rotation of pin 92 of ring member 86.

When power is applied to drive motor 20 by means of a separate switch (not shown) motor 20 is energized and will rotate shaft 26 and its accompanying drive pulleys 24 and 26. Belts 34 and 36 will rotate driven pulleys 30 and 32, respectively. Because pin 73 is removed from the path of pin 92 driven pulley 32 will not be coupled to the shutter shaft to drive the same, but will rotate relative thereto. Driven pulley 30, however, will rotate on shaft 28 until its pin 62 picks up pin 58 of collar 46, and places driven pulley 30 in driving engagement with collar 46. Collar 46, secured to shaft 28, will rotate shaft 28 in a clockwise direction as shown in FIG. 5. Shutter disk 42 will thus also be rotated in a clockwise direction, and, as pin 94 on disk 42 co-operates with slot 98 of disk 40, shutter disk 40 will be carried along with disk 42. Shutter blades 41 and 43 of shutter disks 40 and 42 will be in alignment and interrupt the projector light beam simultaneously.

For the reverse operation of the projector, at normal speed, the direction of rotation of electric drive motor 20 is reversed and accordingly, the direction of rotation of drive pulley 22, belt 34 and driven pulley 30, collar 46, driven shaft 28 and disk 42 will be reversed. As best shown in FIG. 5, pin 94 on disk 42 would thus tend to move in slot 98 towards end 108 in order to drivingly couple disk 40 for rotation. However, tension spring 100 exerts a force sufficient to retain the end 106 of slot 98 in engagement with pin 94.

Figures 2, 3:
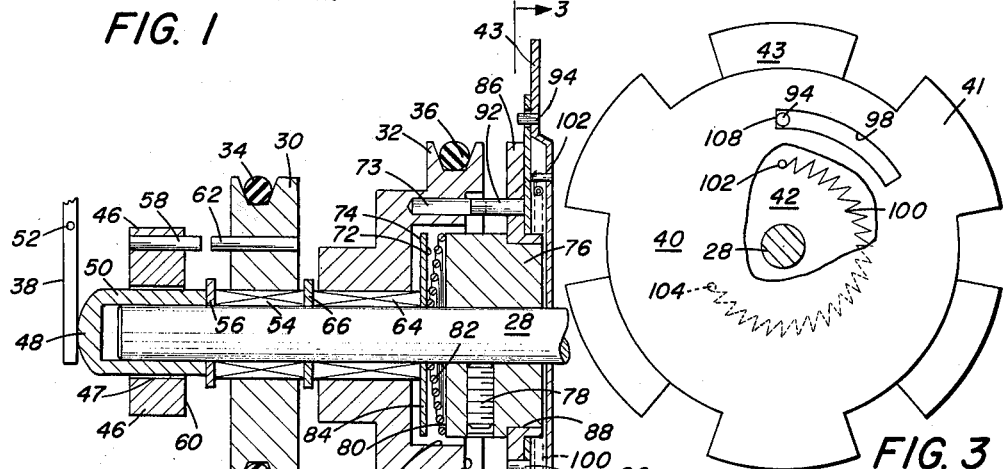
FIG. 2 is a side view, in cross-section, showing the shutter mechanism in the slow speed position.
FIG. 3 is a view, partially in section, of the shutter mechanism taken along the line 3—3 of FIG. 2.

If now, the slow speed operation is desired, control lever 38 is pivoted counterclockwise about its point 52 from the normal speed position to the slow speed position as shown in FIG. 2. When control lever 38 is so moved, legs 50 of actuator member 48 bear against washer 56 and by virtue of this engagement will move washers 56, 66, and 72, bearings 54 and 64, and their respective driven pulleys 30 and 32, along shaft 28 towards hub member 76. The pivotal force exerted on lever 38 is sufficient to compress spring 82. A detent (not shown) will retain lever 38 in the slow speed position. In this position pin 62 of pulley 30 is longitudinally displaced and becomes disengaged from pin 58 of collar 46, whereas the path of rotation of pin 73 of pulley 32 is now moved into the path of rotation of pin 92 of ring member 86. Pin 73 picks up pin 92 and carries it along with it so that ring member 86 and hence disk 40 are being driven by pulley 32. Because of the inertia forces of the pulldown mechanism 44 (see FIG. 1), shaft 28 and hub 76, disk 40 will slidably rotate on hub member 76 until pin 73 engages pin 92, after which disk 40 is in driving engagement with motor 20.

As best shown in FIG. 3, when disk 40 is driven, it will rotate in a clockwise direction relative to disk 42 until pin 94 reaches the end 108 of slot 98 in disk 40, after which disk 42 will be carried along with disk 40, Thus, as is shown in FIGS. 1, 2, and 3, disk 40 is displaced arcuately relative to disk 42, by a distance determined by the length of slot 98. In this position, wherein pulley 32 is driving disk 40 at a slower speed, blades 41 of disk 40 are displaced relative to blades 43 of disk 42 to provide a six bladed shutter for interrupting the light beam. The drive for the pulldown mechanism 44 is now: drive motor 20, drive pulley 24, belt 36, driven pulley 32, pin 73, pin 92, hub member 76, disk 40, pin 94, disk 42 and shaft 28. Driven pulley 30, which is constantly being driven by belt 34, freely rotates on shaft 28.

Figure 6:
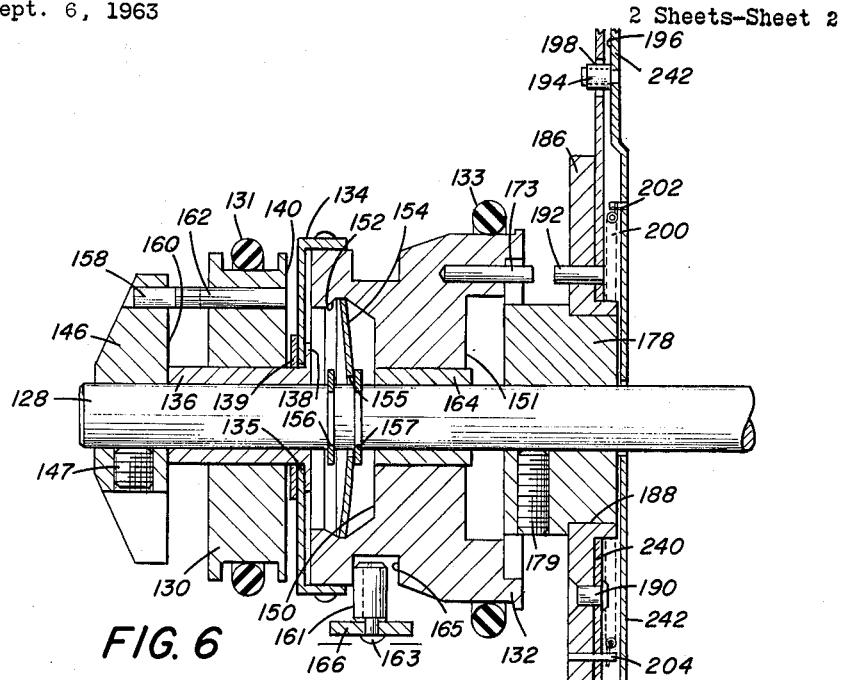
FIG. 6 is a side view, in cross-section, of another embodiment of the shutter mechanism which is shown in the normal speed position.
Figure 7:
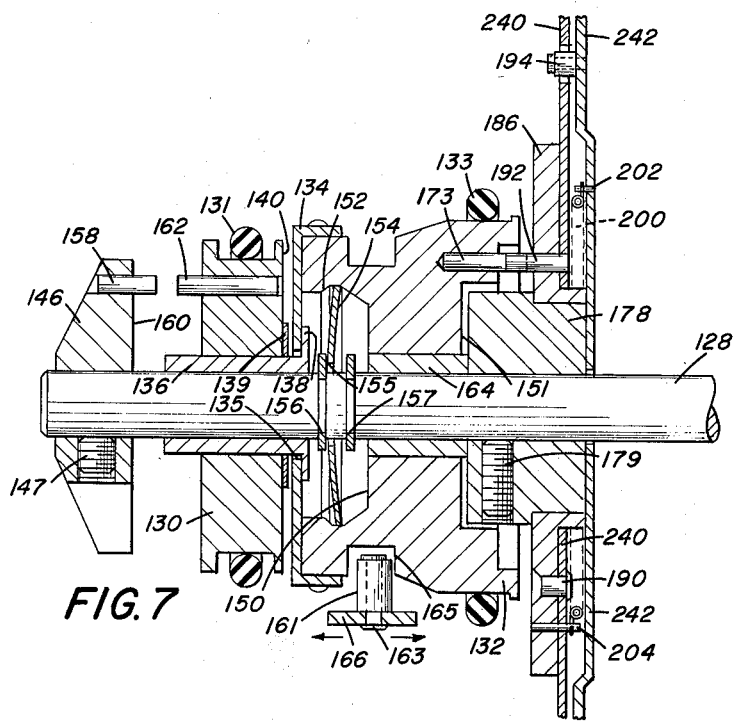
FIG. 7 is a side view, in cross-section, showing the shutter mechanism of FIG. 6 in the slow speed position.

Another embodiment of the shutter mechanism is illustrated in FIGS. 6 and 7, in which driven pulleys 130 and 132 are coupled together for movement along the axis of shutter shaft 128 by a cup shaped coupling member 134. Pulley 130, carried on bearing 136, is revolvably mounted on shutter shaft 128. Bearing 136 includes a ring shaped flange 138 at one of its ends. A ring-shaped washer 139 is revolvably mounted on the outer surface of bearing 136 and is positioned intermediate flange 138 and end face 140 of pulley 130.

A collar 146 is fastened to shaft 128 by screw 147 and has a pin 158 projecting from its inner face 160 towards pulley 130. Pin 158 is positioned at a given distance from the center axis of shutter shaft 128 and moves in a given circle of rotation. A similar pin 162 on the face of driven pulley 130 prejects towards collar 146 and moves in the same given circle of rotation as does pin 158.

Similarly, driven pulley 132, carried on cylindrical slide bearing 164, is mounted for rotation relative to shaft 128. Driven pulley 132 has a diameter which is greater than the diameter of driven pulley 130 so that the peripheral speed of pulley 132 will be less than the peripheral speed of pulley 130 when the pulleys are driven by equal diameter drive pulleys connected to the drive shaft (not shown). Pulley 132 includes a pair of centrally disposed circular cavities 150 and 151, respectively, which are formed in the opposite faces of pulley 132. A pin 173 projects outwardly from the face of pulley 132 adjacent to cavity 151. Cavity 150 has a recessed groove portion 152 adjacent its bottom, which groove portion has a diameter larger than the cavity, for accepting an overcenter toggle spring 154 which is movable between two positions. The opposite ends of toggle spring 154 engage the walls of groove portion 152 to seat the toggle spring within cavity 150. An enlarged aperture 155 in the center of toggle spring 154 permits the toggle spring to move between its two positions without binding on the surface of shaft 128. A pair of spaced rings 156 and 157 are fastened to shaft 128, and are positioned thereon to engage the opposite marginal surfaces adjacent aperture 155 for the purpose of limiting the displacement of the central portion of toggle spring 154.

Coupling member 134, which has an aperture 135 centrally located therein of a diameter greater than the diameter of bearing 136 but less than the diameter of flange 138, is fastened to pulley 132 and substantially encloses the opening of cavity 150. The marginal portions of coupling 134 adjacent aperture 135 is positioned intermediate flange 138 of bearing 136 and washer 139. Thus, pulley 132 is coupled to pulley 130 such that any movement of pulley 132 along the axis of shaft 128 will move pulley 130 a corresponding distance.

Pulley 132 includes a groove 165 formed in the circular outer surface thereof. A roller 161, revolvably mounted on a pin 163, fastened to movable control lever 166, is positioned to engage the walls of groove 165. Control lever 166 is swingable between two positions, and, because of the co-operation of roller 161 with groove 165, will move pulleys 130 and 132 along shaft 128. Toggle spring 154 co-operating with rings 156 and 157 on shaft 128 quickly moves pulleys 130 and 132 from one position to the other, and further retains the pulleys in the position they are moved to.

A circular hub member 178 is fastened to shaft 128 by set screw 179. A cylindrical ring member 186 is revolvably carried on shoulder 188 of hub member 178 for rotation relative to shaft 128. A shutter disk 240 is fastened by means of a rivet 190 to ring member 186 for rotation therewith relative to shaft 128. A pin 192 fastened to ring member 186 projects outwardly from its surface and towards pin 173. Pins 173 and 192 are positioned on pulley 132 and ring member 186, respectively, at the same radius from the center axis of shaft 128. Shutter disk 242 is fastened to shaft 128 for rotation therewith and moves in a plane of rotation which is parallel to the plane of rotation on disk 240.

A pin 194, fastened to disk 242, projects away from the face 196 thereof and is slidably accepted in a slot 198 on disk 240. Coiled tension spring 200 extending between pin 202 on disk 242, and pin 204 on disk 240, couples shutter disks 240 and 242 together in a manner similar to that previously disclosed. Except for the above difference, this embodiment is substantially like that previously disclosed in conjunction with the FIGS. 1–5.

In operation, control member 166 is preferably first positioned in the normal speed position as best shown in FIG. 6, wherein the marginal portions of the aperture 155 of the toggle spring 154 engage washer 157 on driven shaft 128, and the toggle spring urges pulley 132 and pulley 130 towards collar 146. In this position, pulley 130 is driven by drive belt 131 with pin 162 rotating in the path of pin 158. Collar 146 will rotate shaft 128, and shutter disk 242 in a manner similar to that disclosed with reference to FIGS. 4 and 5. By virtue of the pin-in-slot connection, shutter disk 240 will be driven by shutter disk 242 with their blades in alignment to provide a three blade shutter in accordance with the embodiment shown in FIGS. 1–5. If now, the slow speed operation is desired, control lever 166 will be moved to the right and viewed in FIG. 7. In moving control lever 166, roller 166 will engage the opposite wall of groove 165 in pulley 132. The force exerted by lever 166 will move driven pulleys 130 and 132 towards shutter blades 240 and 242, which movement will displace toggle spring 154 from its position as shown in FIG. 6 to its position as shown in FIG. 7. In so moving driven pulley 130, pin 162 carried thereby is laterally displaced and becomes disengaged from pin 158 of collar 146; while at the same time, the pin 173 of pulley 132 is now moved into the path of rotation of pin 192 of ring member 186. Pin 173 picks up pin 192 and carries it along so that ring member 186 and hence disk 240 will be driven by pulley 132. Now, as the drive is now connected to disk 240, disk 240 will rotate relative to disk 242 until the end of the slot 198 engages pin 194 on disk 242 whereupon the two disks will rotate together. This relative rotation of the two disks provided by the pin and slot connection results in the two disks forming a shutter having twice the number of blades as when they are in alignment, as disclosed in connection with the embodiment shown in FIGS. 1–5. As pulley 132 has a larger diameter, shutter shaft 128 will rotate at the desired slower speed for slow motion effect. Because the shutters 240 and 242 have been displaced relative to each other, their shutter blades (not shown) will be arcuately displaced relative to each other to form a shutter providing a sufficient number of interruptions of the light beam to prevent light flicker.

While the embodiments of the invention shown and described herein have been particularly described relative to a motion picture projector, it is to be understood that the inventive idea can be carried out in any other motion picture apparatus in which a variable blade shutter is desired.

The invention has been described in detail with particular reference to embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. In a motion picture projector having drive means selectively capable of at least two different speeds of operation and a shutter driven by said drive means, said shutter comprising at least two coaxial disks each provided with a like number of blades and rotatably displaceable relative to one another between a first condition, wherein the blades of said two disks are in alignment with one another to, in effect, utilize half the total number of blades, and a second condition, wherein the blades of said two disks are displaced relative to each other to utilize the total number of blades, the improvement comprising:
    (a) a lost motion drive connection between said disks for selectively driving either disk by the other and which provides a relative rotational displacement of said disks between said first condition when one of said disks is driven by the other and said second condition when said other disk is driven by said one disk, and
    (b) means for selectively connecting said disks to said driven means to be rotated thereby in response to a selected change in speed of operation of said drive means.

2. In a motion picture projector having a drive shaft, a driven shaft normally operatively coupled to said drive shaft to be driven thereby, a first shutter secured to said driven shaft for rotational movement therewith and including at least one radial blade, a second shutter rotatably mounted on said driven shaft coaxially with said first shutter and including at least one radial blade, the improvement comprising:
    (a) a selective drive coupling between said first and second shutters movable between a normal first condition, in which said first and second shutters are rotated together with their blades in overlapping relation, and a second condition, in which said first and second shutters are rotated together after their blades have been arcuately displaced, and
    (b) means movable between a first position, wherein said driven shaft is normally coupled to said drive shaft and said selective drive coupling is in said normal first condition, and a second position, wherein said driven shaft is uncoupled from said drive shaft and said selective drive coupling is in said second condition.

3. The motion picture apparatus of claim 2 wherein said selective drive coupling between said first shutter and said second shutter includes a pin and slot connection for moving the blades of said first and second shutters together in said normal first condition and for limiting the arcuate displacement of said first shutter relative to said second shutter in said second condition.

4. The motion picture projector of claim 3 wherein said drive shaft is reversible and said selective drive coupling between said first shutter and said second shutter includes a spring member urging said first and second shutters to move together with their blades in overlapping relation when said drive shaft moves in the reverse direction and said first shutter is coupled and driving said second shutter in the normal first condition.

5. The motion picture projector of claim 4 wherein the force exerted by said spring member is less than the combined inertia and friction force of said driven shaft and said first shutter, when said drive shaft is coupled to said second shutter in said second condition whereby the blade of said first shutter is arcuately displaced relative to the blade of said second shutter.

6. In a motion picture projector having an optical system, a driven shaft, a first shutter secured to said driven shaft for rotational movement therewith and having at least one radial blade adapted to interrupt the light passing through said optical system, and means operatively coupled to said driven shaft for intermittently advancing a filmstrip in a predetermined path past said optical system when said blade interrupts said optical system, the improvement comprising:
    (a) a second shutter having at least one radial blade thereon for interrupting the light passing through said optical system, said second shutter rotatably mounted on said drive shaft coaxially relative to said first shutter;
    (b) a selective drive coupling between said second shutter and said first shutter movable between a first condition, wherein the blades of said shutters are rotated together in overlapping relation and a second condition, wherein the blades of said first and second shutters move together after being arcuately displaced relative to one another for the purpose of changing the number of light interruptions;
    (c) a shiftable transmission means movable between two positions for selectively operating said driven means at two different speeds;
    (d) and means for moving said selective drive coupling to and from said first condition in response to movement of said shiftable transmission to and from the highe of said operating speeds.

7. In motion picture projector having a projection light beam, a drive shaft, a driven shaft, a first shutter secured to said driven shaft for rotational movement therewith and having at least one radial blade adapted to interrupt said light beam, and means operatively coupled to said driven shaft for intermittently advancing a filmstrip in a predetermined path past said light beam when said blade interrupts said light beam, the improvement comprising:
    (a) a first shiftable transmission means normally coupling said driven shaft to said drive shaft for rotating said first shutter;
    (b) a second shutter, rotatably mounted on said driven shaft coaxially relative to said first shutter, and having at least one radial blade thereon adapted to interrupt said light beam,
    (c) a second shiftable transmission means driven by said drive shaft and freely rotatable on said driven shaft when said first shiftable transmission means normally couples said driven shaft to said drive shaft:
        (1) said first and second shiftable transmission means movable simultaneously longitudinally of said driven shaft from a normal position to a second position for uncoupling said first transmission means from said drive shaft and coupling said second transmission means to said driven shaft, and
    (d) actuating means for selectively moving said first and second shiftable transmission means from said normal position to said second position.

8. The apparatus of claim 7 wherein said second transmission means includes means for reducing the speed of rotation of said driven shaft when said second transmission means is coupled to said drive shaft.

9. The apparatus of claim 7 wherein said second transmission means includes a peripheral groove and said actuating means includes a roller rotatably mounted on a shiftable lever, with the axis of rotation of said roller substantially perpendicular to the axis of rotation of said driven shaft, and whose surface is engageable with the side walls of said groove for moving said second shiftable transmission between said normal position and said second position.

10. The apparatus of claim 9 wherein said actuating means includes a toggle spring for rapidly moving said first and second transmission means between said normal position and said second position, and retaining the same in the one of said two positions into which it is moved thereby.

11. The apparatus of claim 7 wherein said second transmission means includes a spring member for urging said second transmission means into said normal position.

12. The apparatus of claim 11 wherein said atcuating means includes a coaxial slide member operatively connected to a shiftable lever and movable longitudinally of said driven shaft for moving said transmission means from said normal position to said second position.

References Cited by the Examiner

UNITED STATES PATENTS

| 1,700,513 | 1/1929 | Porter | 352—209 |
| 1,800,088 | 4/1931 | Debrie | 352—209 |
| 3,135,157 | 6/1964 | Thevenaz | 352—209 X |

JULIA E. COINER, *Primary Examiner.*